(12) United States Patent
Gehlot

(10) Patent No.: US 6,957,046 B2
(45) Date of Patent: Oct. 18, 2005

(54) SYSTEM AND METHOD FOR REDUCING MULTIPATH INTERFERENCE IN PACKETIZED WIRELESS COMMUNICATION SYSTEMS

(75) Inventor: Narayan L. Gehlot, Sayreville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 532 days.

(21) Appl. No.: 10/079,755

(22) Filed: Feb. 19, 2002

(65) Prior Publication Data

US 2003/0157884 A1 Aug. 21, 2003

(51) Int. Cl.[7] ................................................ H04B 1/10
(52) U.S. Cl. ...................... 455/65; 455/506; 455/504; 455/295; 455/296; 455/63.1; 375/346; 375/349
(58) Field of Search ........................ 455/65, 506, 504, 455/295, 296, 63.1; 375/346, 349

(56) References Cited

U.S. PATENT DOCUMENTS

| | | | | |
|---|---|---|---|---|
| 4,349,915 A | * | 9/1982 | Costas | ........................ 375/267 |
| 6,031,882 A | * | 2/2000 | Enge et al. | .................. 375/343 |
| 6,128,337 A | * | 10/2000 | Schipper et al. | ............ 375/229 |

* cited by examiner

*Primary Examiner*—Vivian Chin
*Assistant Examiner*—Sanh Phu

(57) ABSTRACT

A system for reducing multipath interference in a wireless data transmission generally includes a processor and memory device for capturing one or more data packets of the wireless data transmission. The transmitting device associates a time value and/or a spatial value to each of the data packets. Upon capture, the processor determines whether the captured data packet is reflective or non-reflective by comparing the time value or spatial value, as applicable, of the captured data packet to the time value or spatial value of each stored non-reflective packet. The system identifies the captured data packet as non-reflective, if the time value (or spatial value) of the captured packet is different from the time value (or spatial value) of each stored non-reflective packet.

20 Claims, 4 Drawing Sheets

SYSTEM AND METHOD FOR REDUCING MULTIPATH INTERFERENCE IN PACKETIZED WIRELESS COMMUNICATION SYSTEMS

FIELD OF THE INVENTION

The present invention relates generally to wireless communication systems and, in particular, to a system and method of reducing Doppler impairment of wireless communication signals.

BACKGROUND OF THE INVENTION

Generally speaking, wireless communication systems operate by transmitting packetized telephone or data signals between various base stations and mobile wireless devices, such as, for example, wireless telephones and Personal Digital Assistants (PDAs), to name a few. Both the base stations and mobile wireless devices function as transmitters and receivers depending on whether the device is sending or receiving a wireless data transmission. As used herein the term "data" or "data transmission" refers generally, without limitation, to any voice or data signal capable of being transmitted between wireless devices, such as, for example, a telephone voice signal, video/audio signal, fax signal, electronic computer file, or the like.

A problem common to such wireless packetized communication systems is that the data transmission may be subjected to multipath interference, which is commonly referred as to Doppler impairment. For instance, when a packetized data transmission is transmitted from a wireless device (typically broadcast 360 degrees about the transmitter) to a receiver, the individual packets of the data transmission may encounter various obstacles, such as tall buildings or the like, which may create reflections of the individual packets. As such, the receiver may capture both an original packet and multiple reflections of that packet. This condition can cause various problems in reception of the data transmission, including but not limited to echoing and packet cancellation.

Presently, receivers are programmed to filter out the reflective packets. These present systems, however, utilize very complicated and sometimes ineffective algorithms to perform such filtering.

SUMMARY OF THE INVENTION

I have recognized that it is desirable to provide a system and method that more efficiently filters reflective packets so as to reduce multipath interference. Moreover, upon filtering of the reflective packets, it is desirable to provide a method and system to combine like packets to increase signal strength. Thus, the present invention overcomes the various shortcomings of present multipath interference filtering systems for use with packetized wireless communications systems. Generally, the system more efficiently filters reflective packets so as to reduce multipath interference. Moreover, upon filtering of the reflective packets, the system can combine like packets to increase signal strength. More specifically, according to an embodiment of the present invention, a method of reducing multipath interference in wireless communication generally includes associating each data packet of a data transmission with a time value. Upon receipt of a first data packet of the data transmission, the receiver stores the first data packet in a first memory partition and designates the packet as so-called "non-reflective". The receiver then will receive one or more subsequent data packets of the data transmission and moreover, possibly multiple copies of them as well as of the first packet. The time value of each subsequently received data packet is compared to the time value of each previously stored non-reflective data packet. If the time value of a subsequently received data packet is identical to any one of the previously stored non-reflective data packets, then the receiver designates the subsequently received data packet as reflective. If, however, there is no match, the receiver designates the subsequently received data packet as non-reflective and the data packet is stored in a second memory partition. As used herein, the term a "memory partition" refers to memory space allocated in a memory device to receive and store non-reflective packets. This cumulative matching/filtering process preferably continues for an optimized number of iterations.

According to another feature of a embodiment of the present invention, the receiver and transmitter may further include a global positioning system (GPS), which can record the communication device's position at any given time or use relative coordinates in increments in the absence of a GPS signal. In the absence of a GPS signal the most recent coordinates are used as a reference and, in the case of loss of the GPS signal, new psuedo coordinates are generated by incrementing the last available coordinates until the GPS signal is restored. As the data transmission is packetized by the transmitting communication device, the GPS records a three dimensional position, represented in the x, y, and z coordinates in addition to the time value. The communication device then associates the spatial and temporal information (position and time stamp) with a particular packet being sent to a receiver for further communication to a second communication device. Spatial and temporal information may be either true and absolute or derived from the last set of spatial and temporal information until such information may be established again. As the individual packets are received, the receiver uses a GPS device to record its own base position and time coordinate.

The spatial and temporal information (position/time stamp) of the packet is then rationalized to the spatial and temporal information (position/time coordinates) of the base system, thereby producing a spatial and temporal (position/time) vector. If the communication device is moving, then subsequent packets will have different position and time vectors from earlier or other packets. In this way, the receiver can further distinguish those reflective packets from non-reflective packets. However, if the transmitter is not moving (i.e., stationary), then the receiver will analyze only the relative differences in the time vectors to determine reflective packets from non-reflective packets.

To reduce the bandwidth overhead associated with the communication of the packets, the position/time coordinates can be coded in bit format using binary digits. In this way, a cyclical repetition of packet filtering may be performed depending upon the processing power of a particular communications device. To further reduce the bandwidth overhead associated with the position/time coordinates, the position and time bits may be modulated as part of the carrier signal. For example, if the carrier is phase modulated, the space and time bits may be transmitted by using the pilot tone or by modulating the polarization, frequency, or amplitude of carrier.

DETAILED DESCRIPTION

Figure 1:
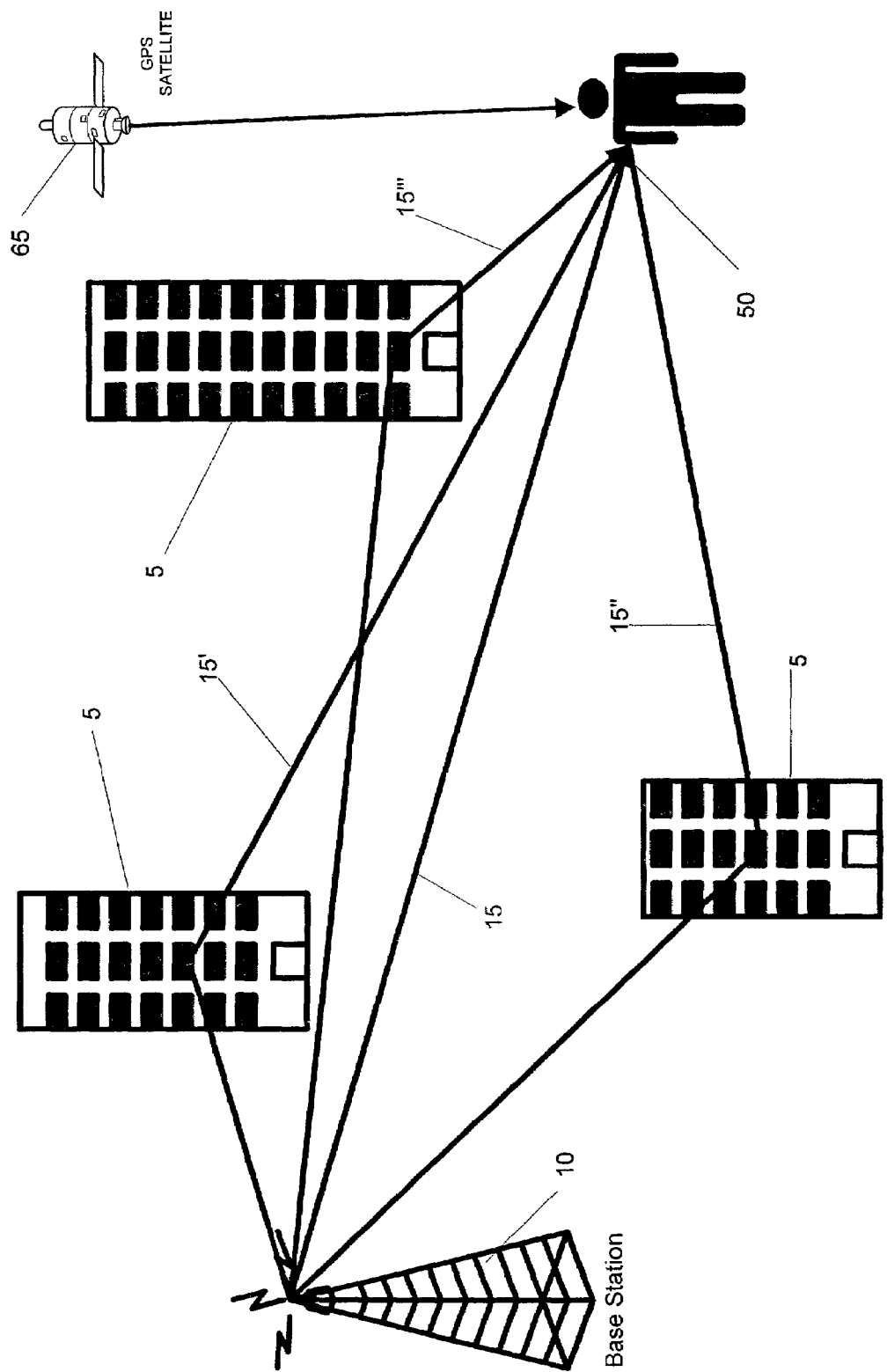
FIG. 1 is a schematic diagram of a transmitter and receiver in wireless communication in accordance with an exemplary embodiment of the present invention.

With reference to FIGS. 1–4, there will be described a system and method for reducing multipath interference (commonly referred to as Doppler impairment) in wireless, packet-based communications. As shown in FIG. 1, signals packets 15, relayed from a base station 10 to a mobile device 50, for instance, can be reflected off obstacles 5 so as to cause multiple reflections 15', 15'', 15''' of a particular signal packet 15 to be received by the mobile device 50. As described above, the inability to effectively filter reflections 15' can have adverse and undesirable effects on the transmission of wireless communication signals 12. One skilled in the art will readily recognize that base station 10 and mobile device 50 can both function as a "transmitter" and "receiver", as commonly known in the art, and use of the terms "base station" and "mobile device" are for illustrative purposes only.

According to an embodiment of the present invention, both the mobile device 50 and base station 10 are equipped with global positioning system (GPS) devices (not shown) to enable the mobile device 50 and base station 10 to record spatial coordinates transmitted from a GPS satellite 65 for each data packet sent or received, as applicable, by the mobile device 50 and/or base station 10. This position/time coordinate is associated to a particular packet 15 and used by the receiving device to distinguish reflective packets from non-reflective packets so as to filter reflections 15' from non-reflective packets 15. As will become evident from the following discussion, the system operates whether both the base station 10 and mobile device 50 are stationary or one or both are moving relative to the other.

Figure 2:
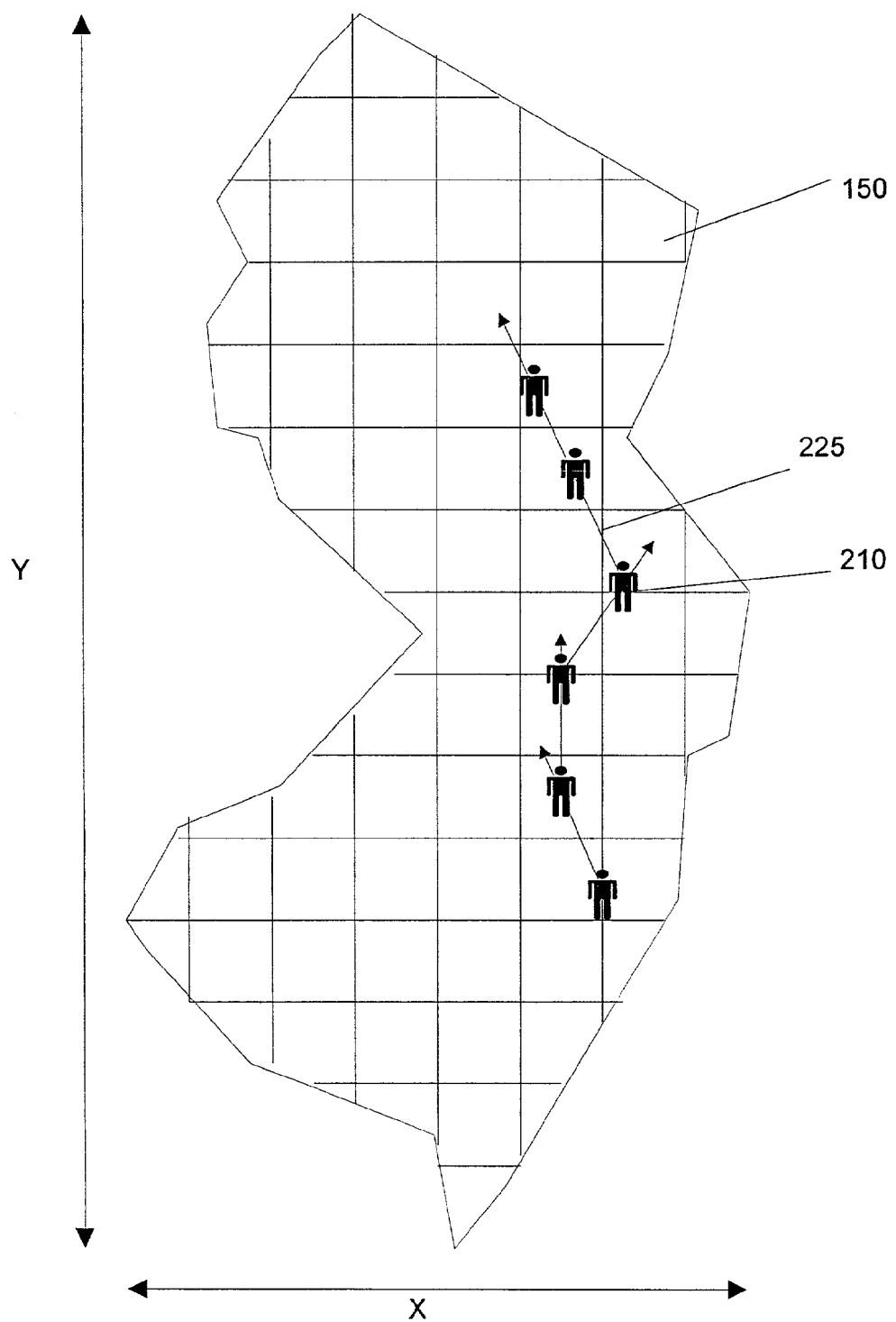
FIG. 2 is a schematic diagram of a grid overlay in accordance with an exemplary embodiment of the present invention.

The spatial component of the position/time coordinate is preferably recorded using a three-dimensional coordinate system to represent longitudinal, latitudinal, and relative height above sea level. It will also be understood that the position aspect of the coordinate may be representative of an area grid having a pre-defined granularity. For example, as shown in FIG. 2, a particular city, state or other such region may be assigned a rectangular (x, y) grid 150 having coordinates separated by a pre-defined distance. One skilled in the art will recognize that any regional or geographical area may be assigned a grid 150 and that use of the map of New Jersey is purely illustrative. Thus, where the pre-defined distance is five (5) meters, a person standing at x=1 would be 30 meters from a person at x=6. The time component of coordinate is preferably recorded using a standardized time value, such as, by way of non-limiting example, Greenwich Mean Time (GMT). Thus, for the purposes of illustration in connection with the following disclosure, a position/time coordinate will be represented as x, y, z, and t coordinates.

Figure 3:
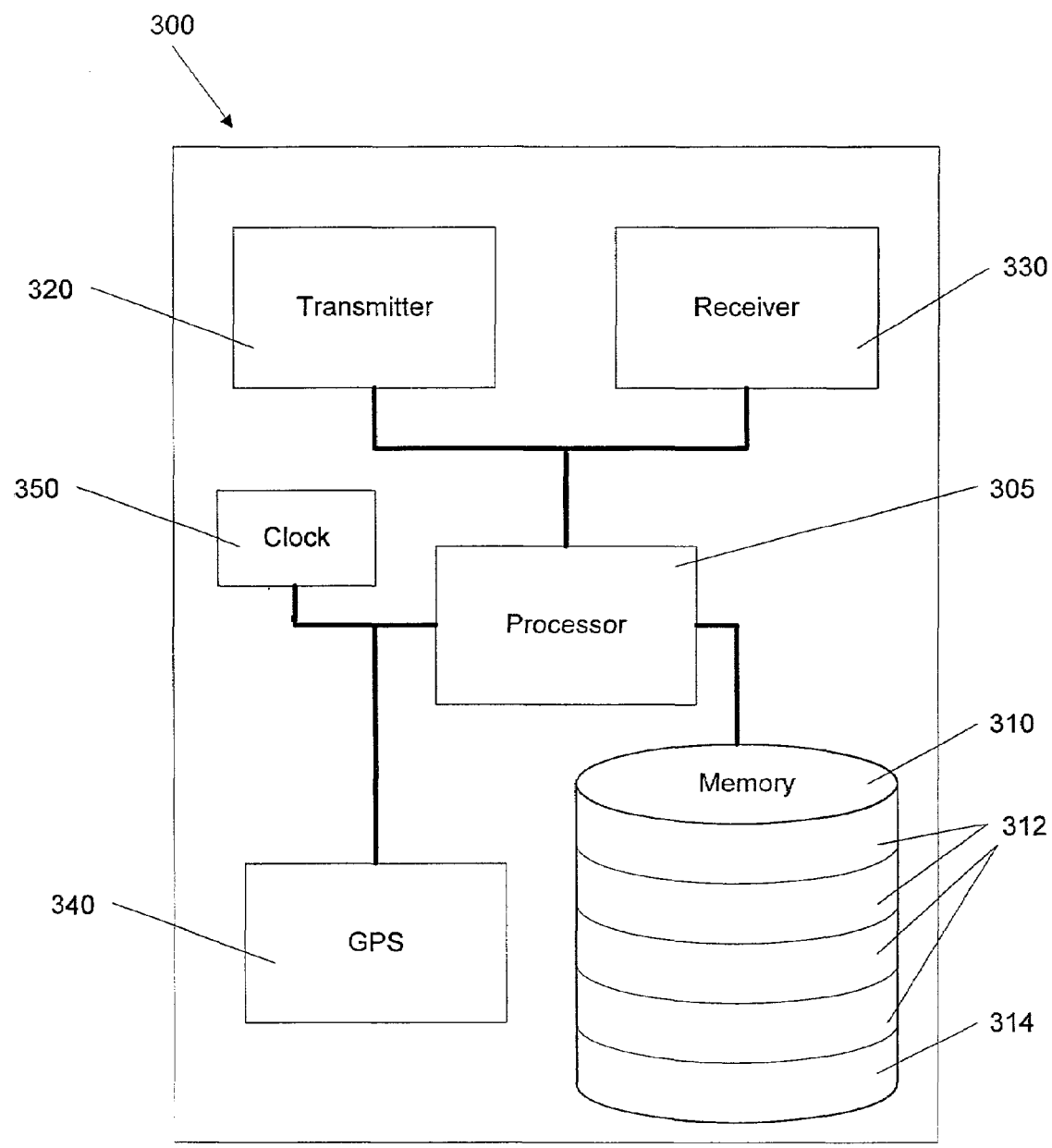
FIG. 3 is a is a schematic diagram of a multipath interference minimization system in accordance with an exemplary embodiment of the present invention.

As shown in FIG. 3, a system 300 for use with the present invention generally comprises a processor 305 operative with programming to perform the functionality described herein. The system 300 also includes a memory device 310 that further comprises a plurality of memory partitions 312 and a memory cache 314 for storing the data packets 15 (shown in FIG. 1) as they are received and analyzed. Yet further, the system 300 comprises a transmitter 320 and receiver 330 for sending and receiving the data packets 15. A GPS device 340 is preferably included so as to enable the system to associate the spatial component to the data packet 15 and calculate a motion vector, as further described below. Furthermore, the system 300 preferably includes an internal clock 350 so as to enable the system 300 to associate a temporal component (e.g., a time stamp) with the data packet 15. The system 300 also other such devices and components as a typically found in such systems and generally known to those of skill in the art. It will also be understood that the system 300 may be included in both the transmitter and receiver as to enable more efficient minimization of multipath interference.

The position/time coordinate is integrated (or stamped) into the packet 15. As such, each packet becomes associated with a particular position (x, y, z) and time (t). As the packets 15 are transmitted some of the signals may be reflected off obstructions. In this way, the same packet in multiple reflections 15', 15'', 15''' may be received by the mobile device 50. These reflections may be received simultaneously with or after subsequent packets. Therefore, the reflections can cause interference with the reception of the signal. To filter out the reflections 15' from the non-reflective packets 15, the system compares the position/time coordinates for each of the packets received to determine which of the packets are reflections, as described in greater detail in the example below. The position/time coordinate may be included in the packet's preamble/header/tail/body or pilot tone or carrier signal.

Figure 4:
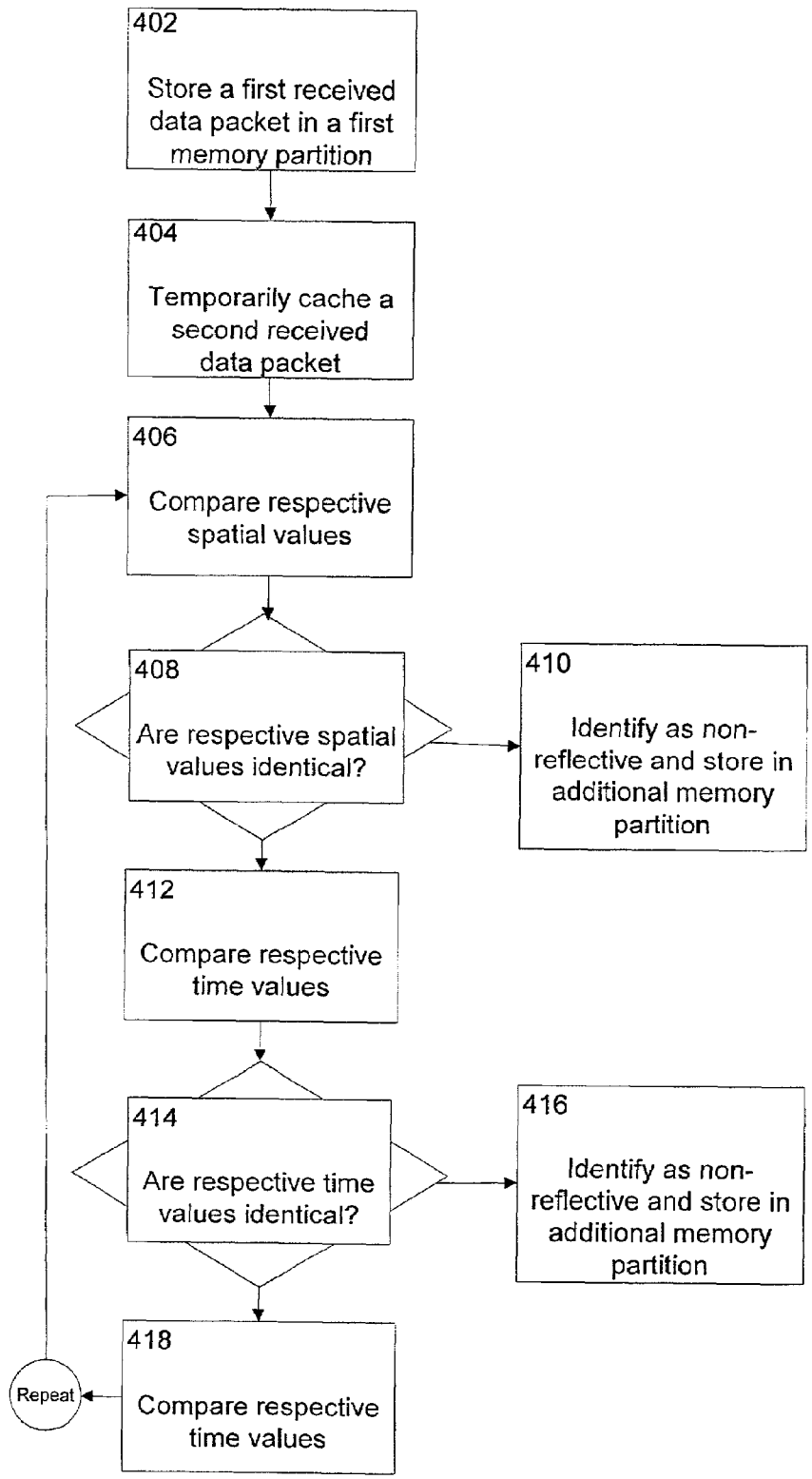
FIG. 4 is a flow diagram of a method of iteratively identifying reflective and non-reflective data packets in accordance with an exemplary

With reference to FIG. 4, there is shown an illustrative signal reception sequence 400 in which reflections are received at varying intervals. In step 402, a first received data packet of the data transmission is stored in a first memory partition. In step 404, a second received data packet is temporarily cached. Next, in step 406, the spatial value of the second received data packet is then compared to the spatial value of the first received data packet, which is stored in a first memory partition. In step 408, if the respective spatial values of the first and second received data packets are identical, then the process 400 moves to step 412. In the alternative, if the respective spatial values of the first and second received data packets are different, then, in step 410, the second received packet is identified as a non-reflective packet and stored in a second memory partition. Once the packet is identified as a non-reflective packet, the system waits to receive the next packet and begin the iterative checking process again. In step 412, the respective time values of the first and second received data packets are compared. In step 414, if the time values are different, then the second received data packet is identified as a non-reflective packet and stored in a second memory partition (Step 416). Otherwise, in step 418, the second received data packet is identified as a reflective packet and aggregated with the first received packet in the first memory partition to increase signal strength.

In step 420, the process steps 406–418, as applicable, are repeated for each subsequently received data packet. For instance, the spatial and time values of a third received data packet are compared with the respective time values of the first and second received data packets in an iterative fashion so as to designate the third received data packet as reflective, if the time values of either the first and third received data packets or second and third received data packets are identical, or as non-reflective, if the time values of both the first and second received data packets are different from the time value of the third received data packet.

To further illustrate the process shown in FIG. 4, the following reception sequence is described: P(t1, s1), P(t1', s1') P(t2, s2), P(t1", s1"), P(t2', s2'), P(t3, s3), P(t2", s2"), P(t1''', s1'''), P(t4, s4), and so forth. The first received packet P(t1, s1), which becomes the primary comparison packet is stored in a first memory (M1). The system uses the first received packet P(t1, s1) as a base reference to determine whether subsequently received packets are reflections or non-reflective packets. Upon receipt of the next packet, P(t1', s1'), the system compares (or auto-correlates) the time component (t1') with the time component of the primary packet (t1) stored in memory (M1). Since the packet, P(t1', s1'), has an originating time (t1') that is the same to the time (t1) stored in memory M1, the system can determine that packet P(t1', s1') is a reflection. In addition, by comparing the spatial component (s1') of packet P(t1', s1') to the spatial component of the first packet (s1), the system can determine that the transmitting mobile device is stationary.

The next received packet, P(t2, s2), is temporarily stored in a second memory (M2) so that it may be compared to the primary packet P(t1, s1). Upon receipt, the system compares the time component of the next received packet (t2) with the time component of the primary packet (t1), which is stored in memory (M1). Because the originating time (t2) is different from (t1), the system determines that packet P(t2, s2) is not the same as the primary packet. Thus, the new packet P(t2, s2) is stored in memory (M2). The system can then compare the spatial component of the new packet (s2) to the spatial component of the primary packet (s1). If the respective spatial components are the same, then the system determines that the mobile transmitting device is stationary. In contrast, if the spatial components are different, then the system determines that the mobile transmitting device is moving.

The next received packet P(t1", s1") is first compared by the system to the primary signal and previously sorted packets to determine whether it is a reflection. Thus, the time component (t1") of packet P(t1", s1") is first compared with (t1) of the primary signal. Since the (t1") is the same as (t1), the system can determine that packet P(t1", s1") is a reflection. By comparing the spatial component (s1") to (s1), as described above, the system also determines that the originating space is the same as the primary packet. In this example, there is no need to compare the packet to the packet stored in memory M2, and so on, because the system has already determined that the packet is a reflection of the packet in M1.

The following illustrates the sequential autocorrelation used by the system to identify the next received packet P(t2', s2'). First, the time and spatial components of packet P(t2', s2') are compared to the primary packet P(t1, S1).signal. Once the system determines that the packet P(t2', s2') is not a reflection of the primary packet P(t1, s1), the system moves on to the next stored packet. Thus, packet P(t2', s2') is compared to the packet stored in memory M2. In this way, the system can determine that packet P(t2', s2') is a reflection of the packet stored in memory M2.

With respect to the next received packet P(t3, s3), the system first makes a comparison with the primary packet P(t1, s1). Once it is determined that packet P(t3, s3) is not a reflection of the primary packet stored in memory (M1), the system makes a comparison to the packet P(t2, s2) stored in memory (M2). At this point, the system will determine that packet P(t3, s3) is not a reflection of packet P(t2, s2) and packet P(t3, s3) will be stored in Memory (M3).

This sequence continues for each successive packet received until all of the received packets are identified by the system and stored accordingly. It will also be recognized by those skilled in the art that the time and space processing may be performed by the system in parallel to reduce processing time. Furthermore, the time and spatial components of new packets may be shared with all stored memory locations (e.g., M1, M2, M3, etc.) simultaneously, so that by parallel processing, the system can determine the best match in a single processing cycle using exhaustive comparisons. Using the spatial vector information, the system can determine the three-dimensional direction that a mobile device is moving. Information gathered may also be used to compensate for the Doppler effect and other reflections by using the signal origination and direction of motion from previous measurements and compensations already calculated.

As a further feature of the system, when a packet is processed by hand held device and the base station is at a fixed location, only temporal information changes. The base station can indicate an absolute location and a relative packet origination to indicate new packet. Thus, the absolute time stamp and relative spatial stamp is possible from base to mobile device.

In operation, as the system sequentially analyzes each packet received, the system also prepares the packet for re-transmission in a known manner. The total number of reflections that can be cached by the system is limited by the memory of the system, which may be small to address certain design considerations, such as cost and size. In addition, the amount of time between reception and re-transmission (e.g., the delay associated with final packet output) is a concern. As described herein, the packets and their reflections aggregate one-by-one in each respective memory. However, if the time between reception and retransmission is very large, then delays in speech, video and data signal output can be undesirably generated. Thus, the number of reflections cached is preferably optimized for a particular service as a matter of design choice.

For the purpose of illustration, the system may be optimized to sequentially analyze ten (10) separate packets before re-transmitting the primary packet P(t1, s1), which is stored in memory M1. Because the system memory is optimized in this example, for ten packets, the primary packet and then the remaining stored packets are retransmitted as subsequent packets are received. In other words, when the tenth packet is received, the primary packet is retransmitted to a destination and the next stored packet becomes the primary packet. This process continues until all packets have been retransmitted. It is possible, however, for a reflective packet P(t1"", s1""), for example, to be received after the primary packet P(t1, s1) was retransmitted. In such an instance, the reflection P(t1"", s1"") would appear to the system as a new packet, rather than a reflection and a new memory location for the reflected signal would be created. To overcome this problem, according to a embodiment of the present invention, an array of captured time and spatial coordinates for retransmitted packets is stored by the system. Thus, any signal appearing with the same stored time and spatial coordinates will be recognized as a reflection and destroyed. For example, if P(t1''', s1''') arrives after P(t1, s1) has been processed and retransmitted, the time and spatial components (t1, s1) is stored in the array so as to enable the system to sort out reflective packets that are received beyond the optimized cycle (in this example ten packets).

According to a further feature of the present invention, the system can aggregate like packets to increase signal strength. In other words, as reflections of a primary packet or other stored packet are detected, the reflections can be added to the memory storing the packet so as to increase the signal strength of the primary packet in a manner known in the art.

Yet further, to reduce the need for absolute time and spatial coordinate values, the coordinates can be coded in bit format to reduce the bandwidth overhead associated with the communication of the packets. In this way, a cyclical repetition of packet filtering may be performed depending upon the processing power of a particular communications device. For example, depending on the bit size of the code, the system may be optimized to filter out reflections for a pre-determined number of packets. Specifically, the formula for determining how many packets a given bit format can handle is $2^n$, where n is the number of bits in the code. By way of example, a four (4) bit code can handle up to sixteen (16) primary packet signals. A five (5) bit code can handle up to thirty-two (32) primary packet signals. Herein, use of a three (3) bit system is described, which can handle up to nine (9) primary packet signals. It should be understood that any number of bit format may be used consistently with the disclosure provided herein.

According to the 3-bit example, as the packets are transmitted from the mobile device, each of the first eight successive packets is assigned a 3-bit code (e.g., 000, 001, 010, 100, 101, 111, 011, or 110). The ninth packet is then assigned the first code in the series (e.g., 000). Thus, the ninth packet looks to the system like the first packet. As such, the 3-bit system can only handle reflections for the first eight packets. As is evident from the foregoing, the greater the resolution (i.e., minimization of multipath interference) desired, the larger the bit size of the code.

To further reduce the bandwidth usage associated with the position/time coordinates, the position and time bits may be modulated as part of the carrier signal. For example, if the carrier is phase modulated, the space and time bits may be transmitted by using the pilot tone or by modulating the polarization, frequency, or amplitude of carrier.

According to a further feature, the system can analyze the respective spatial values of the stored non-reflective data packets to calculate a movement vector 225 of the mobile device. For instance, with reference again to FIG. 2, if a person 210 is traveling north while using his/her mobile device to transmit and receive data (e.g., a telephone conversation), the system 300 can plot the respective spatial values of the received and stored non-reflective data packets so as to identify the movement of the mobile device and, thus, the person.

While the invention has been described in connection with embodiments, it will be understood that modifications thereof within the principles outlined above will be evident to those skilled in the art and thus, the invention is not limited to the embodiments but is intended to encompass such modifications.

I claim:

1. A method of reducing multipath interference in a wireless data transmission, the method comprising the steps of:
    (a) capturing a plurality of data packets associated with the wireless data transmission, each of the data packets being associated with a time value, and wherein some of the data packets being captured are non-reflective packets and some are reflective packets;
    (b) determining whether each captured data packet is reflective or non-reflective by:
        comparing the time value of the captured data packet to the time value of each stored non-reflective packet;
        identifying the captured data packet as non-reflective, when the time value of the captured packet is different from the time value of each stored non-reflective packet; and
        identifying the captured data packet as reflective, when time value of the captured packet is identical to the time value of any stored non-reflective packet; and
    (c) repeating the determining step for each subsequently captured data packet.

2. The method of claim 1, further comprising the step of storing each non-reflective data packet is a separate memory partition.

3. The method of claim 2, further comprising the step of aggregating the reflective data packet in the memory partition that stores the non-reflective data packet for which the reflective packet is reflective.

4. The method of claim 1, wherein, in said determining step, the time value of the captured data packet is sequentially compared to the time value of each stored non-reflective data packet.

5. The method of claim 1, wherein, in the determining step, the time value of the captured data packet is substantially simultaneously compared to the time value of each stored non-reflective data packet.

6. The method of claim 1, further comprising the step of deleting each captured data packet identified as reflective.

7. The method of claim 1, wherein the time value is coded in a bit format.

8. The method of claim 1, wherein the time value is modulated as part of a carrier signal associated with the wireless data transmission.

9. The method of claim 1, wherein a spatial value is associated with each data packet of the wireless data transmission and further comprising in the determining step, prior to comparing the respective time values:
    comparing the spatial value of the captured data packet to the spatial value of each stored non-reflective packet; and
    identifying the captured data packet as non-reflective, if the spatial value of the captured packet is different from the spatial value of each stored non-reflective packet.

10. The method of claim 9, further comprising the step of analyzing the respective spatial values of the stored non-reflective data packets such that a movement vector can be calculated.

11. A method of reducing multipath interference in a wireless data transmission being comprised of a plurality of data packets, each of the data packets being associated with a time value, the method comprising:
    (a) storing a first received data packet of the data transmission in a first memory partition;
    (b) comparing the time value of a second received data packet with the time value of the first received data packet;

(d) designating the second received data packet as reflective, if the respective time values of the first and second received data packets are identical, or designating the second received data packet as non-reflective, if the respective time values of the first and second received data packets are different;

(e) comparing the time value of a third received data packet with the respective time values of the first and second received data packets; and (f) designating the third received data packet as reflective, when the time values of either the first and third received data packets or second and third received data packets are identical, and designating the third received data packet as non-reflective, when the time values of both the first and second received data packets are different from the time value of the third received data packet.

12. The method of claim 11, wherein a spatial value is associated with the data packets of the data transmission and the method further comprises:

sequentially comparing the spatial value of subsequently received data packets of the data transmission to the respective spatial values of previously stored non-reflective data packets to determine whether the subsequently received data packets are non-reflective or reflective.

13. A system for reducing multipath interference, comprising:

a receiver adapted to be in wireless communication with a transmitter so as to enable the receiver to capture data packets of a wireless data transmission, the transmitter causing a time value to be assigned to and transmitted with each of the data packets of the wireless data transmission;

a memory interconnected with the receiver to store the data packets; and a processor interconnected with at least the memory;

wherein the processor is operative with programming to iteratively compare the time value of each captured data packets to the time values of ones of stored data packets that are non-reflective, and to determine whether each captured data packet is reflective or non-reflective as a function of that comparison.

14. The system of claim 13, wherein the memory comprises a plurality of memory partitions and wherein each data packet determined to be non-reflective is stored in a separate one of the memory partitions.

15. The system of claim 14, wherein each data packet determined by the processor to be reflective is matched to a corresponding one of the non-reflective data packets and aggregated in the memory partition that stores the matched non-reflective data packet.

16. The system of claim 13, wherein each data packet determined to be reflective is destroyed by the processor.

17. The system of claim 13, wherein the time value is coded in a bit format.

18. The system of claim 13, wherein the time value is modulated as part of a carrier signal associated with the wireless data transmission.

19. The system of claim 13 wherein the transmitter is further operative to cause a spatial value to be assigned to and transmitted with each of the data packets of the wireless data transmission and wherein the processor further operates to compare spatial values of captured data packets to the spatial values of ones of stored data packets that are non-reflective.

20. The system of claim 19, wherein the processor analyzes the respective spatial values of the stored non-reflective data packets such that movement of the transmitter relative to the receiver can be monitored.

* * * * *